(12) United States Patent
Abotabl et al.

(10) Patent No.: US 12,495,401 B2
(45) Date of Patent: Dec. 9, 2025

(54) DEFAULT BANDWIDTH PART (BWP) OPERATION

(71) Applicant: QUALCOMM Incorporated, San Diego, CA (US)

(72) Inventors: Ahmed Attia Abotabl, San Diego, CA (US); Hung Dinh Ly, San Diego, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 17/662,065

(22) Filed: May 4, 2022

(65) Prior Publication Data
US 2023/0362904 A1 Nov. 9, 2023

(51) Int. Cl.
*H04W 72/0453* (2023.01)

(52) U.S. Cl.
CPC .............................. *H04W 72/0453* (2013.01)

(58) Field of Classification Search
CPC ................................................ H04W 72/0453
See application file for complete search history.

(56) References Cited

U.S. PATENT DOCUMENTS

| | | | |
|---|---|---|---|
| 2021/0167930 A1* | 6/2021 | Jeon | H04L 27/2607 |
| 2021/0321409 A1 | 10/2021 | Fakoorian et al. | |
| 2021/0360616 A1* | 11/2021 | Yi | H04L 5/0012 |
| 2022/0069967 A1 | 3/2022 | Li et al. | |
| 2023/0073497 A1* | 3/2023 | Yi | H04W 72/23 |
| 2023/0345391 A1 | 10/2023 | Abotabl et al. | |

FOREIGN PATENT DOCUMENTS

| | | | |
|---|---|---|---|
| WO | WO-2021242611 A1 * | 12/2021 | H04L 27/2602 |
| WO | WO-2023179412 A1 * | 9/2023 | |

OTHER PUBLICATIONS

International Search Report and Written Opinion—PCT/US2023/020440—ISA/EPO—Aug. 17, 2023.

* cited by examiner

*Primary Examiner* — Jackie Zuniga Abad
(74) *Attorney, Agent, or Firm* — QUALCOMM Incorporated

(57) ABSTRACT

Certain aspects of the present disclosure provide techniques for wireless communication by a user equipment (UE), including receiving, from a network entity, default bandwidth part (BWP) configuration information for a plurality of modes of operation of the network entity, the plurality of modes comprising a first mode and a second mode, and the default BWP configuration information indicating a first default BWP for the first mode and a second default BWP for the second mode; receiving, from the network entity, a mode indication indicating the network entity is operating in the first mode; and communicating with the network entity using the first default BWP based on receiving the mode indication and based on expiration of an inactivity timer.

28 Claims, 14 Drawing Sheets

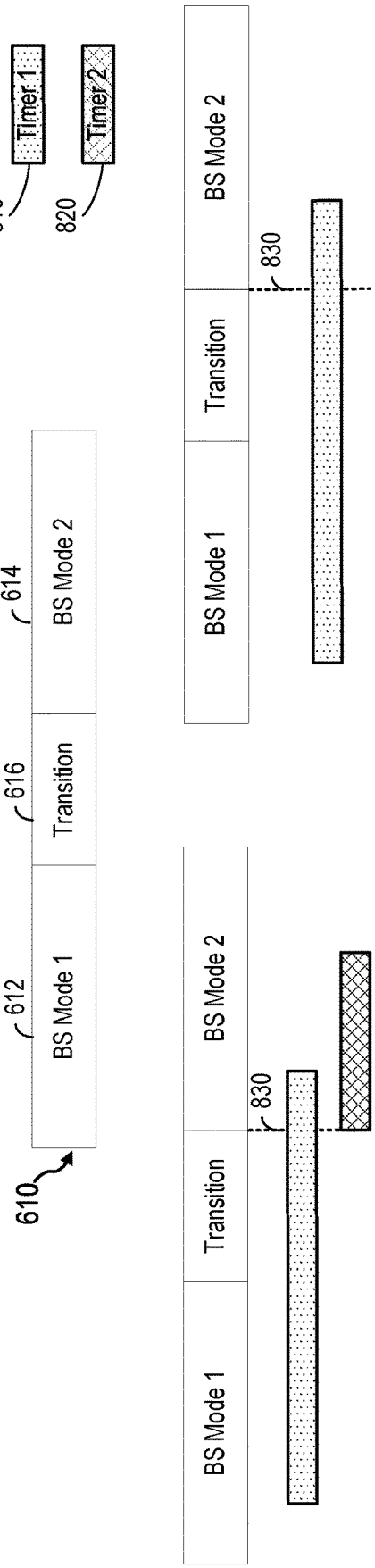
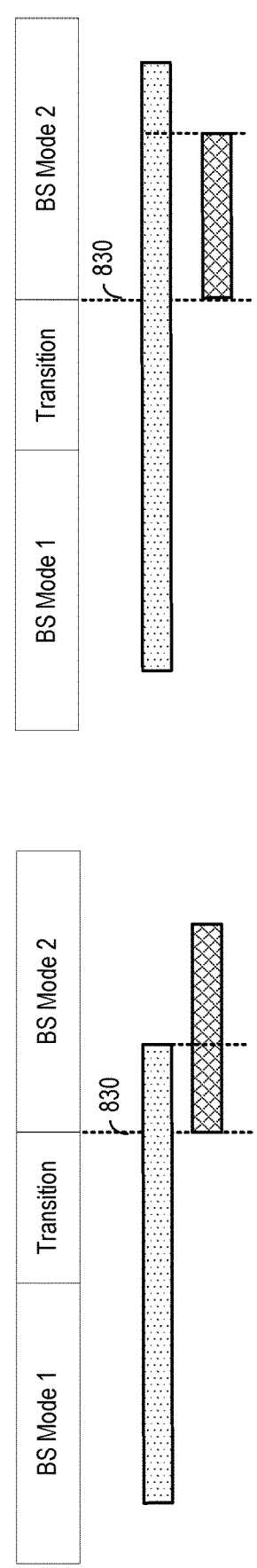
FIG. 8A FIG. 8B FIG. 8C FIG. 8D

DEFAULT BANDWIDTH PART (BWP) OPERATION

BACKGROUND

Field of the Disclosure

Aspects of the present disclosure relate to wireless communications, and more particularly, to techniques for use of default BWPs for communications.

Description of Related Art

Wireless communications systems are widely deployed to provide various telecommunications services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE), including receiving, from a network entity, default bandwidth part (BWP) configuration information for a plurality of modes of operation of the network entity, the plurality of modes comprising a first mode and a second mode, and the default BWP configuration information indicating a first default BWP for the first mode and a second default BWP for the second mode; receiving, from the network entity, a mode indication indicating the network entity is operating in the first mode; and communicating with the network entity using the first default BWP based on receiving the mode indication and based on expiration of an inactivity timer.

One aspect provides a method for wireless communication by a UE, including receiving, from a network entity, BWP inactivity timer configuration information for a plurality of modes of operation of the network entity, the plurality of modes comprising a first mode and a second mode, and the BWP inactivity timer configuration information configuring a first inactivity timer duration for the first mode and a second inactivity timer duration for the second mode; receiving, from the network entity, a mode indication indicating the network entity is operating in the first mode; and communicating with the network entity using a first default BWP based on receiving the mode indication and based on a timer expiring at one of the first inactivity timer duration or the second inactivity timer duration.

One aspect provides a method for wireless communication by a network entity, including sending a default BWP configuration information for a plurality of modes of operation, the plurality of modes comprising a first mode and a second mode, and the default BWP configuration information indicating a first default BWP for the first mode and a second default BWP for the second mode; and sending a mode indication indicating operation in the first mode.

One aspect provides a method for wireless communication by a network entity, including sending BWP inactivity timer configuration information for a plurality of modes of operation, the plurality of modes comprising a first mode and a second mode, and the BWP inactivity timer configuration information configuring a first inactivity timer duration for the first mode and a second inactivity timer duration for the second mode; and sending a mode indication indicating operation in the first mode.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8A-D depicts example scenarios of inactivity timer settings after receiving a mode indication.

DETAILED DESCRIPTION

Figure 1:
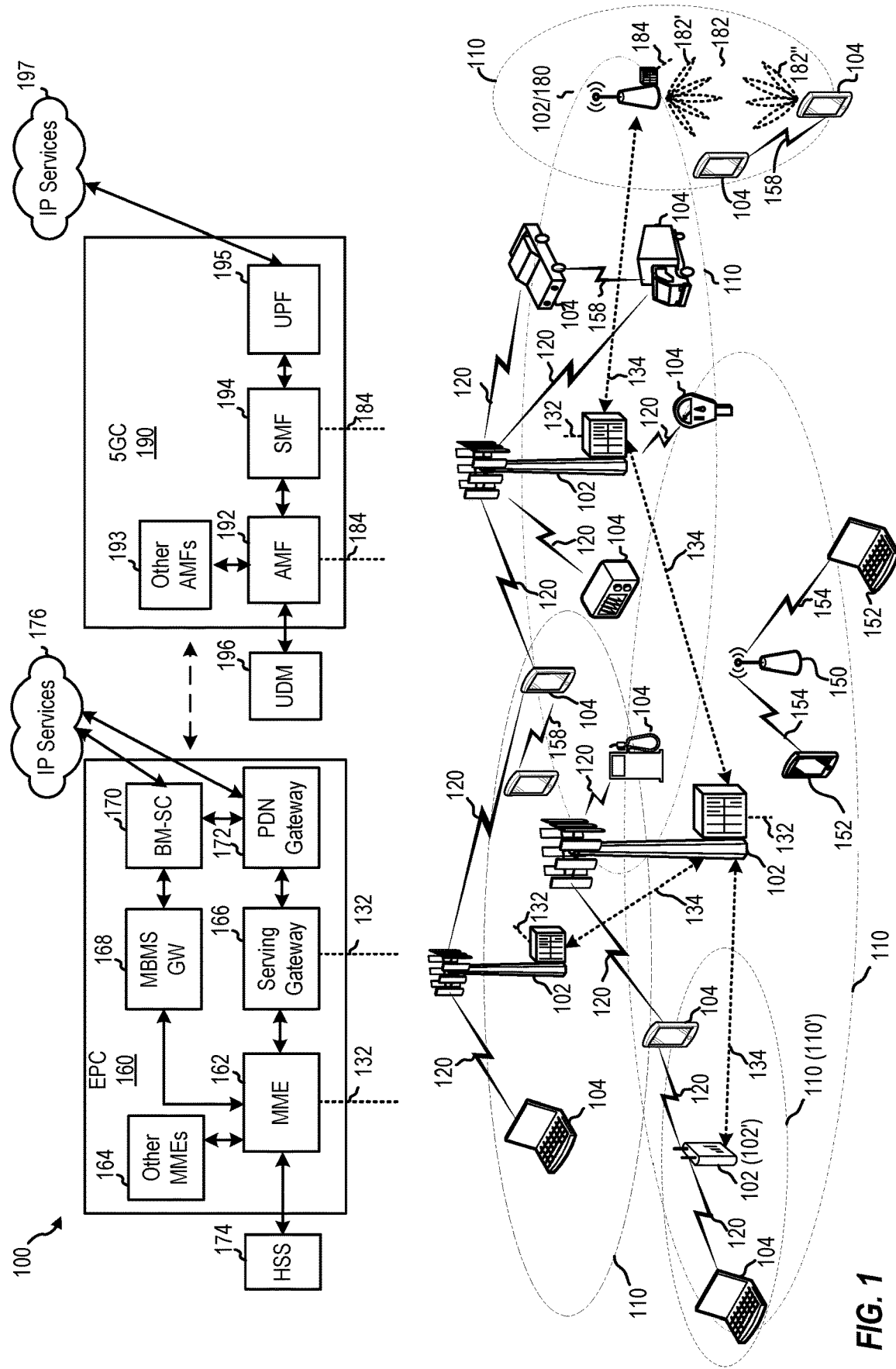
FIG. 1 depicts an example wireless communications network.

Aspects of the present disclosure provide apparatuses, methods, processing systems, and computer-readable mediums for bandwidth part (BWP) configuration for different modes of operation of a network entity.

In wireless communications systems, communications devices are configured to communicate over one or more frequency carriers, each frequency carrier associated with a maximum carrier bandwidth. Certain wireless communications systems, such as 5G NR systems, utilize BWPs for communications between devices, such as between a network entity and one or more user equipments (UEs). In particular, in certain aspects, the bandwidth of a frequency carrier may be subdivided into a number of BWPs. In certain aspects, each BWP is a contiguous set of frequency resources (e.g., physical resource blocks (PRBs)) having a bandwidth (e.g., less than the bandwidth of the overall frequency carrier). Different BWPs may have different configuration parameters, such as numerology, frequency location, bandwidth size, and/or control resource set (CORESET). In certain aspects, different BWPs may refer to BWPs that have the same set of frequency resources, but other one or more configuration parameters (e.g., numerology) that are different.

In certain aspects, a UE may be configured by the network entity with one or more sets of BWPs, such as a first set of BWPs for downlink (DL) communications, and a second set of BWPs for uplink (UL) communications. Further, one or more of the BWPs may be configured as a default BWP, such as one default BWP for both DL and UL communications, or separate default BWPs for DL and UL communications, respectively. In certain aspects, a UE may switch to using a default BWP for communications with the network entity on expiration of an inactivity timer. In particular, the inactivity timer may have a set duration (e.g., X ms), and begin to run when the UE is inactive (e.g., is not communicating data on the UL or DL, such as not receiving on a physical downlink shared channel (PDSCH) and not transmitting on a physical uplink shared channel (PUSCH)). If the UE remains inactive for the duration of the inactivity timer, the inactivity timer expires, and the UE switches to using the default BWP for communications, if the UE was using a different BWP than the default BWP for communications.

In certain aspects, a network entity supports different modes of operation, each mode associated with a set of parameters that the network entity uses for communications. The set of parameters may include one or more of: a number of active antennas of the network entity used for communications, a transmit power used by the network entity, a bandwidth used by the network entity for communications, etc. The amount of power used by the network entity for communications may be different for different modes, based on the different parameters of the modes, and therefore the modes may be referred to as power modes. The network entity may support different modes to achieve power savings, and may switch modes based on network input and/or traffic conditions, such as using a lower power mode when traffic loads are small, and using a higher power mode when traffic loads are large.

In certain cases, it may be beneficial for the UE to be configured with different default BWPs for different modes of operation of the network entity. In particular, different BWPs may be better suited for communications for different modes of operation. Accordingly, certain aspects herein provide techniques for a network entity to configure a UE with default BWP configuration information for a plurality of modes of operation of the network entity, wherein at least one mode is associated with a different default BWP than another mode. Advantageously, this allows a UE to use a default BWP better suited for different modes of operation, which can improve reliability and throughput of communications between the UE and the network entity.

In certain cases, it may be beneficial for the UE to be configured with different BWP inactivity timer durations for different modes of operation of the network entity. In particular, some modes may be used in low traffic situations, where a reduced inactivity timer duration may beneficially allow the UE to switch to a default BWP, which may have a smaller bandwidth, and therefore save power at the UE. Further, some modes may be used in high traffic situations, where an increased inactivity timer duration may beneficially allow the UE to refrain from switching from a higher bandwidth BWP to a default BWP, which may have a smaller bandwidth, and therefore improve throughput of communications. The default BWP may be mode specific, where different modes are associated with different default BWPs, as discussed herein, or may not be mode specific, where the same default BWP is associated with different modes. Accordingly, certain aspects herein provide techniques for a network entity to configure a UE with BWP inactivity timer configuration information for a plurality of modes of operation of the network entity, wherein at least one mode is associated with a different inactivity timer duration than another mode.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
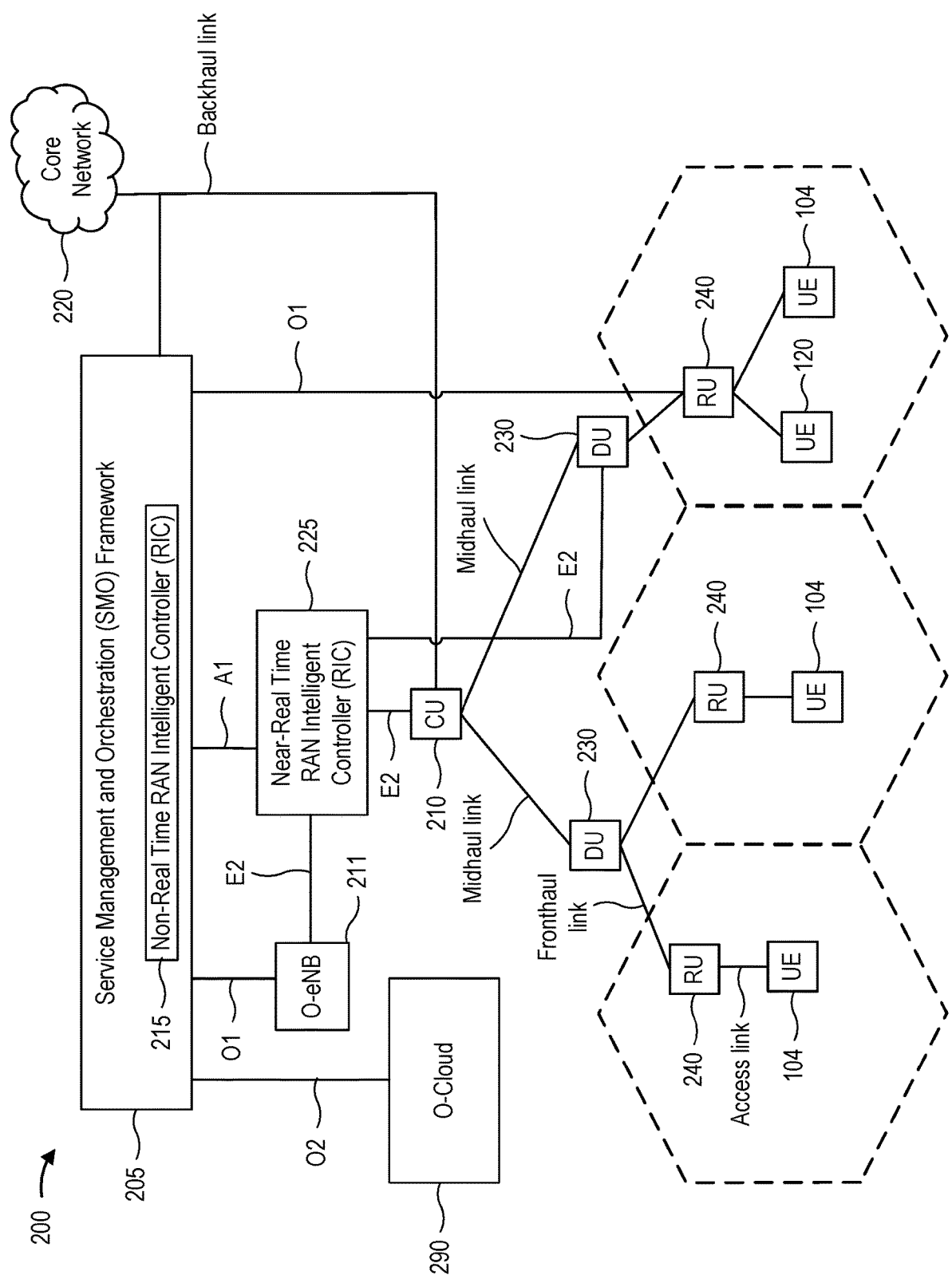
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
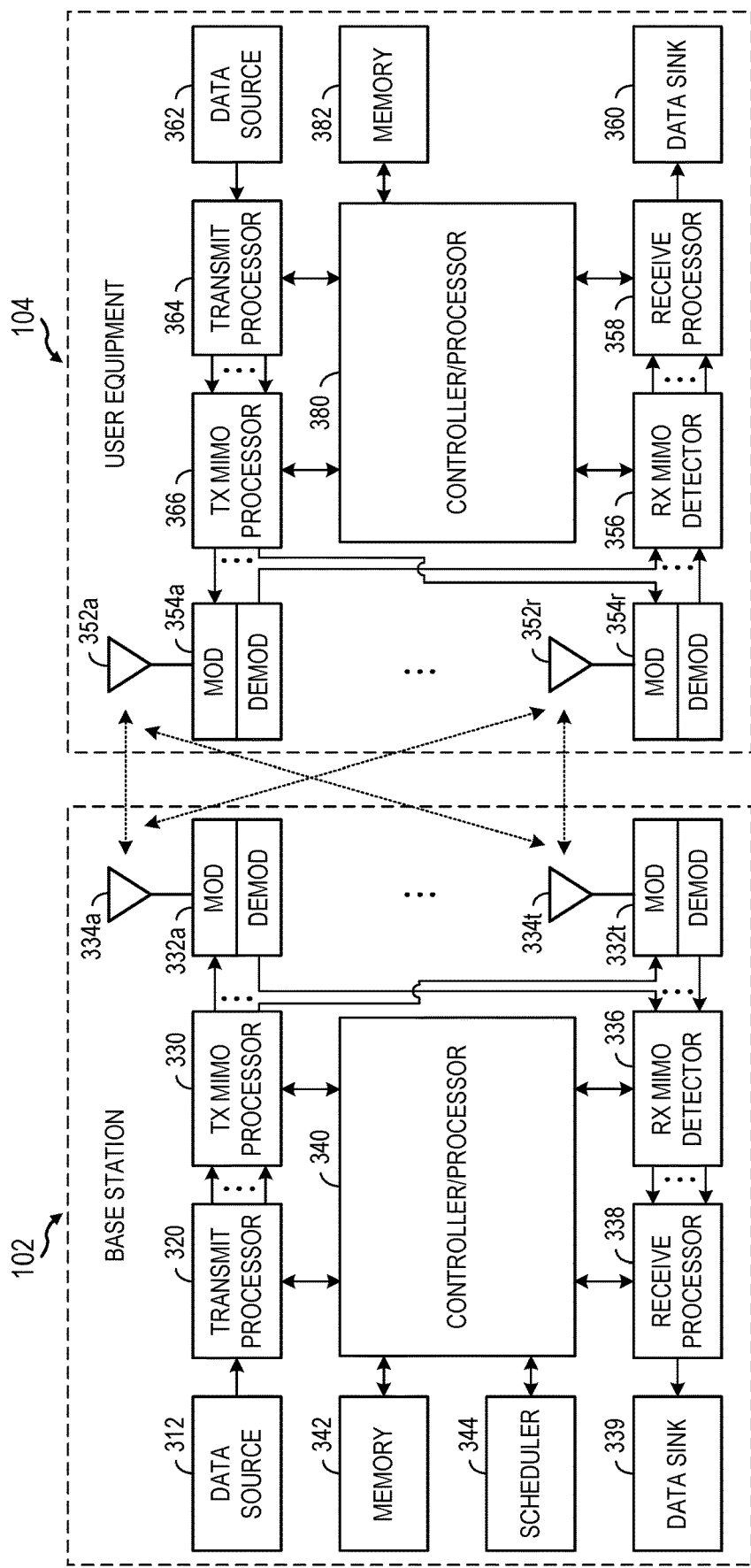
FIG. 3 depicts aspects of an example base station (BS) and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
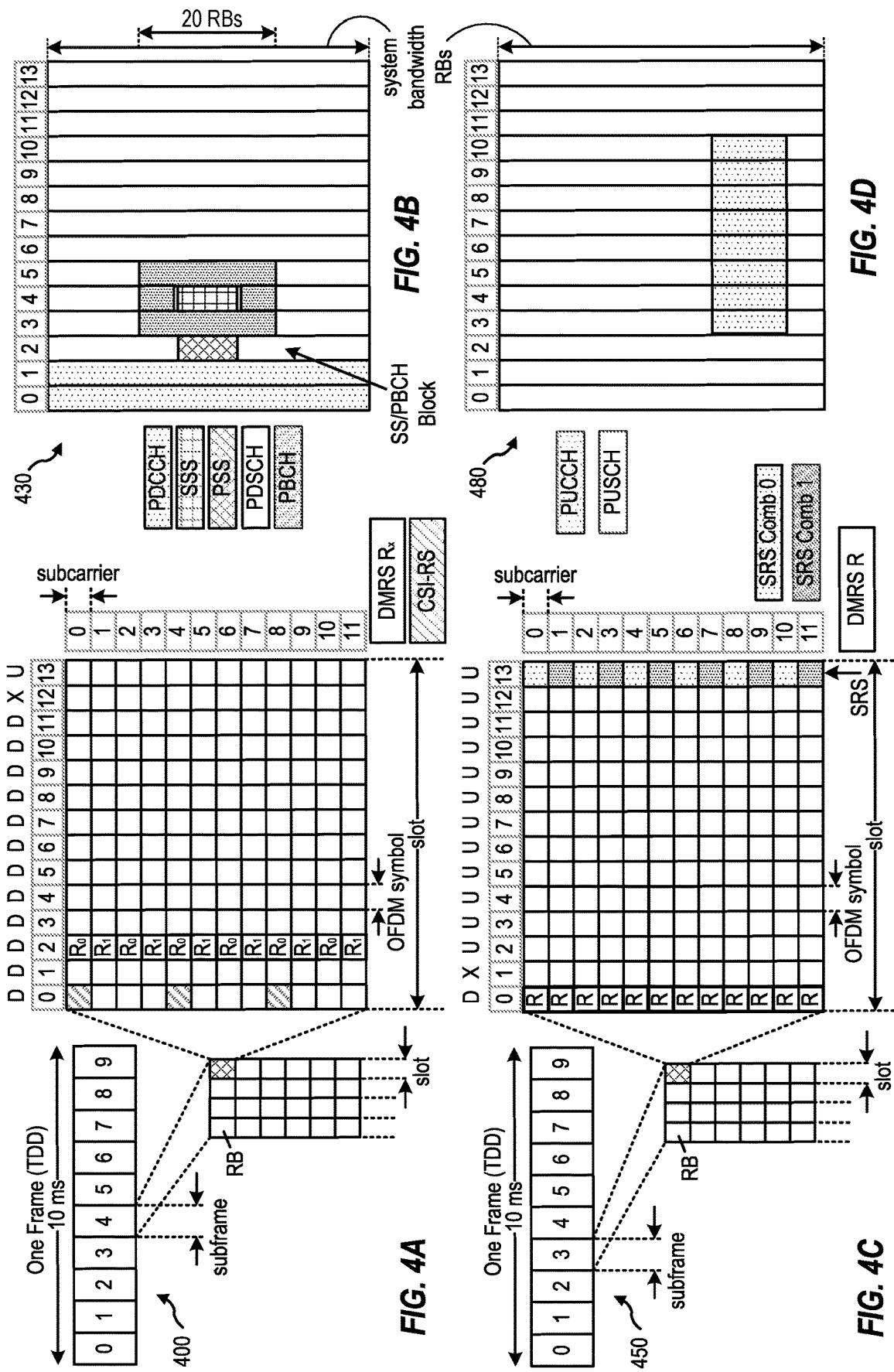
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Configuration of Default BWP

As discussed, certain aspects herein provide for techniques for configuring a UE with different default BWPs for different modes of operation (e.g., power modes) of a network entity. For example, a network entity (e.g., BS 102, a component of a disaggregated BS 102, etc.) can have a plurality of modes of operation and a UE (e.g., UE 104) can be configured (e.g., by the network entity) with a default BWP for each of the modes of operation of the network entity.

This can help the network entity and the UE to save power and communicate in a power-efficient way. For example, the network entity can switch to a mode dedicated to power saving when the network traffic is low. Accordingly, after the network entity switches to a power saving mode, a UE communicating with the network entity may use a default BWP with a smaller bandwidth. In the example, both the network entity and the UE can communicate with smaller power consumption by using the default BWP with a smaller bandwidth that requires less energy for communications.

Figure 5:
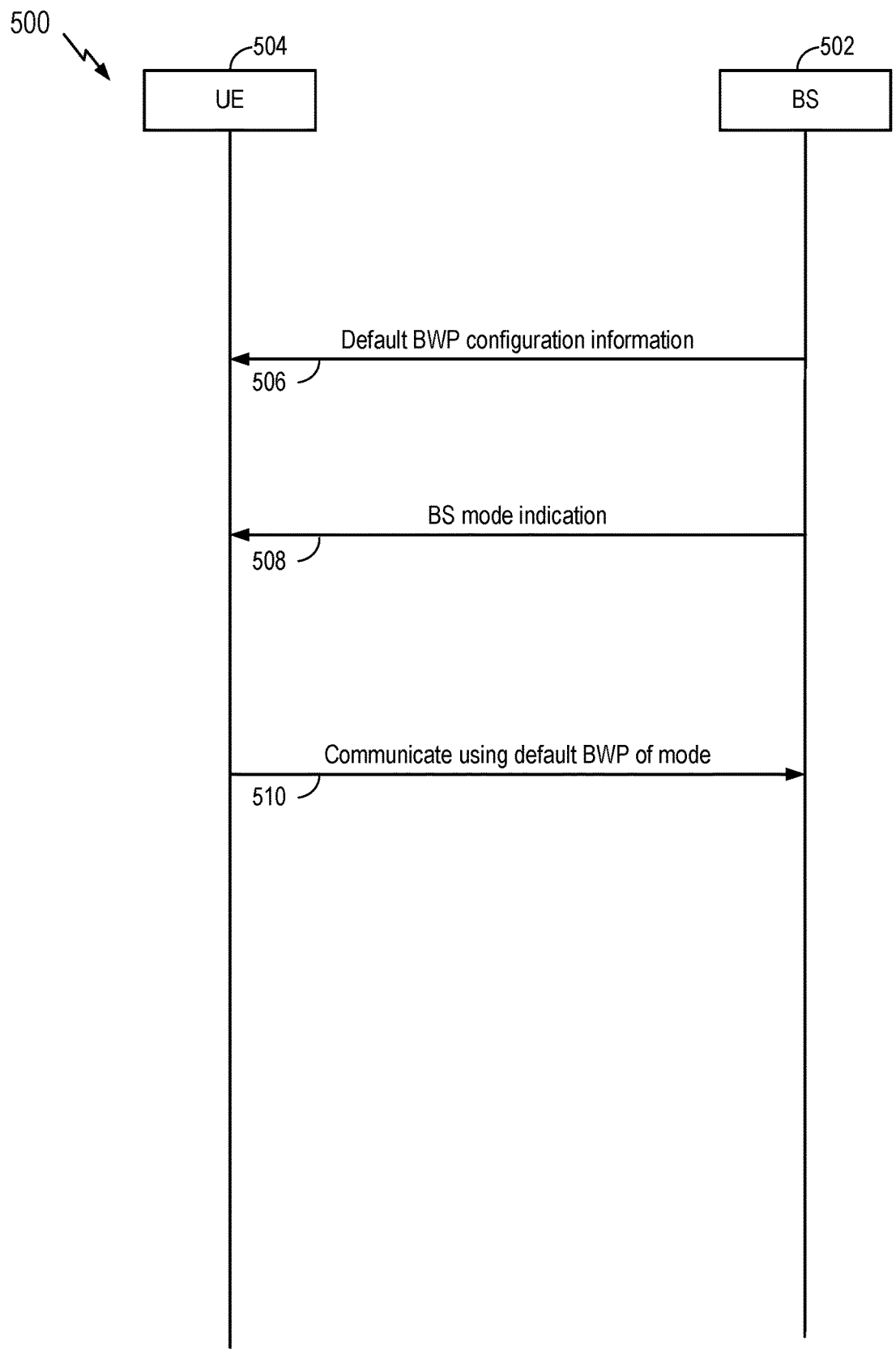
FIG. 5 depicts an example process flow for configuration of a default BWP at a UE.

FIG. 5 depicts a process flow 500 for configuration of a default BWP at a UE. In some aspects, the BS 502 may be an example of the BS 102 depicted and described with respect to FIGS. 1 and 3. Similarly, the UE 504 may be an example of UE 104 depicted and described with respect to FIGS. 1 and 3. However, in other aspects, UE 504 may be another type of wireless communications device and BS 502 may be another type of network entity or network node, such as those described herein. Although FIG. 5 illustrates one UE, the techniques disclosed herein can support any suitable number of UEs.

At 506, the BS 502 may send (e.g., directly or via one or more additional devices), to UE 504, default BWP configuration information for a plurality of modes of operation of the BS 502. The different modes of operation can be specified by the number of antennas, the transmit power, and/or the bandwidth for communicating. In certain aspects, the default BWP configuration information indicates different default BWPs for different modes of operation (e.g., each mode has a different default BWP; or one or more modes have a unique default BWP and one or more modes share a default BWP). For example, the plurality of modes may include a first mode and a second mode, and the default BWP configuration information may indicate a first default BWP for the first mode and a second default BWP for the second mode. A default BWP may be defined by a frequency bandwidth, a starting frequency, a numerology, and/or a search space. In some aspects, the default BWP configuration information can be used by UE 504 to configure default BWPs for the different modes of operation of BS 502.

The default BWP configuration information can include a separate default BWP configuration for each of the plurality of modes of operation. For example, a default BWP configuration may comprise one or more parameters that define a BWP, such as one or more of a frequency bandwidth, a starting frequency, a numerology, and/or a search space. For example, the default BWP configuration information can include a first default BWP configuration defining one or more parameters (e.g., a frequency bandwidth, a starting frequency, a numerology, and/or a search space) of the first default BWP. The default BWP configuration information may further include a second default BWP configuration defining one or more parameters of the second default BWP. The one or more parameters of the first default BWP configuration may not apply to the second default BWP, and the one or more parameters of the second default BWP configuration may not apply to the first default BWP.

Alternatively, the default BWP configuration information can include a common default BWP configuration for all of the plurality of modes of operation and a dedicated default BWP configuration for at least one mode (e.g., the second mode, a group of modes, etc.). For example, wherein the dedicated default BWP configuration is for the second mode, the second default BWP can be based on the common default BWP configuration and the dedicated default BWP configuration. For example, the second default BWP may have parameters indicated by a combination of the common default BWP configuration and the dedicated default BWP configuration.

For example, in some aspects, the common default BWP configuration includes a first set of parameters (e.g., a frequency bandwidth, a starting frequency, a numerology, and/or a search space) and the dedicated default BWP configuration includes a second set of parameters (e.g., a different frequency bandwidth, a different starting frequency, a different numerology, and/or a different search space) different from the first set of parameters.

In some aspects, the common default BWP configuration may define one or more common parameters, such as common frequency bandwidth and common starting frequency that apply to all of the plurality of modes of operation of the BS 502, such as both the first mode and the second mode. Further, in some aspects, the dedicated default BWP configuration may define one or more dedicated parameters, such as a dedicated numerology, that apply to only select modes of operation of the BS 502, such as only the second mode. Accordingly, in such an example, each of the first default BWP of the first mode, and the second default BWP of the second mode, may have the same common frequency bandwidth and common starting frequency. However, in such an example, only the second default BWP may use the dedicated numerology (e.g., the numerology of the first default BWP may be defined by another dedicated default BWP configuration, or may be based on a numerology indicated in the common default BWP configuration). In certain such aspects, the common default BWP configuration includes different parameter types than the dedicated default BWP configuration, such that parameters in the common default BWP configuration do not conflict with parameters in the dedicated default BWP configuration.

In some aspects, one or more of the second set of parameters of the dedicated default BWP configuration conflict with the first set of parameters of the common default BWP configuration. In certain such aspects, for parameters that conflict, the dedicated default BWP configuration take priority. For example, in certain aspects wherein the dedicated default BWP configuration is for the second mode, the second default BWP can be based on the one or more of the second set of parameters that conflict with the first set of parameters. In an example, if the common default BWP configuration indicates a first bandwidth (e.g., 20 MHz), and the dedicated default BWP configuration for a mode indicates a second bandwidth (e.g., 10 MHz), the UE uses the second bandwidth indicated in the dedicated default BWP configuration and not the first bandwidth indicated in the common default BWP configuration. In some aspects, some default BWPs for some modes may be defined solely based on the common default BWP configuration, such as if there is no dedicated default BWP configuration included in the default BWP configuration information for such a mode.

In certain aspects, the default BWP configuration information can be transmitted by the BS 502 to the UE 504 via a signal such as a radio resource control (RRC) message.

Figure 6:
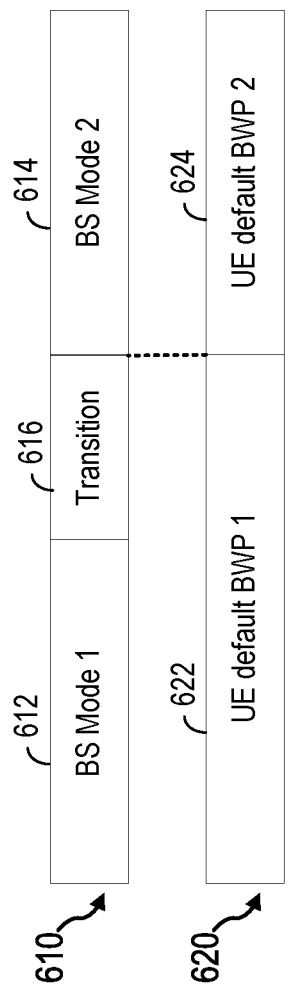
FIG. 6 depicts an example set of modes of operation of a network entity and an example set of default BWPs for a UE.

FIG. 6 depicts an example set of modes of operation 610 of a network entity and an example set of default BWPs 620 for a UE. The network entity (e.g., BS 502) can operate in a first mode 612 and a second mode 614. The first mode 612 and the second mode 614 can be different with respect to the number of antennas, transmit power, and/or bandwidth for communicating. In some examples, the first mode 612 includes using a first number of antennas, a first transmit power, or a first bandwidth for communicating, whereas the second mode 614 includes using a second number of antennas, a second transmit power, or a second bandwidth. For example, in certain aspects, in the first mode 612 all antennas of the network entity are active, whereas in the second mode 614, only a part (e.g., half) of the antennas of the network entity are active.

In some examples, if the network traffic is low, the network entity switches from the first mode 612 to the second mode 614. During the switching, there can exist transition 616. Transition 616 can be a period of time when the network entity has started switching from the first mode 612 to the second mode 614 but does not operate fully in the second mode 614 yet.

Accordingly, the UE can be configured to have a first default BWP 622 and a second default BWP 624. The first default BWP 622 can correspond to (e.g., be dedicated to) the first mode 612 while the second default BWP 624 can correspond to the second mode 614. In some aspects, the first default BWP 622 is used during transition 616.

The first default BWP 622 can be configured according to a first default BWP configuration with respect to a first frequency bandwidth, a first starting frequency, a first numerology, and a first search space. Similarly, the second default BWP 624 can be configured according to a second default BWP configuration with respect to a second frequency bandwidth, a second starting frequency, a second numerology, and a second search space.

In certain aspects, though not shown, the UE can be configured with different default BWPs for UL and DL communications. In certain aspects, BWP switching, as discussed further herein, may be performed at the same time (e.g., based on the same inactivity timer) for UL and DL communications, such as for a UE communicating using time division duplex (TDD). In certain aspects, BWP switching, as discussed further herein, may be performed at independently (e.g., based on different inactivity timers) for UL and DL communications, such as for a UE communicating using frequency division duplex (FDD).

Continuing at 508, BS 502 can send, to UE 504, a mode indication indicating the mode of operation of BS 502. In some aspects, the mode indication indicates that BS 502 is operating in the first mode (e.g., switching to operation in the first mode from prior operation in another mode). For example, the first mode may be first mode 612 shown in FIG. 6. In some aspects, the mode indication indicates that BS 502 is operating in the second mode. For example, the second mode is second mode 614 shown in FIG. 6.

At 510, UE 504 communicates with BS 502 using a default BWP associated with the mode indicated in the mode indication. For example, UE 504 may communicate with BS 502, which is operating in the first mode, using the first default BWP associated with the first mode.

For example, in certain aspects, if prior to receiving the mode indication, UE 504 is communicating with the BS 502 using a default BWP associated with another mode that is different than the first default BWP associated with the first mode, the UE 504 switches to using the first default BWP for communicating with the BS 502 based on receiving the mode indication.

In some aspects, prior to receiving the mode indication, UE 504 is communicating with the BS 502 using an active BWP, as in not a default BWP. The UE 504 may continue to communicate with the BS 502 using the active BWP after receiving the mode indication until expiration of an inactivity timer, as discussed. After expiration of the inactivity timer, in certain aspects, UE 504 switches to using the first default BWP for communicating with the BS 502 based on the BS 502 operating in the first mode. In certain cases, the inactivity timer may start prior to UE 504 receiving the mode indication. In certain cases, the inactivity timer may start after the UE 504 receiving the mode indication.

Aspects Related to Configuration of BWP Inactivity Timer

As discussed, certain aspects herein provide for techniques for configuring a UE with different inactivity timer durations for different modes of operation (e.g., power modes) of a network entity. Configuration of the UE with different inactivity timer durations for different modes of operation of a network entity may be done independently of, or in conjunction with, configuration of the UE with different default BWPs for different modes of operations, as discussed herein. For example, in certain aspects, a UE is configured with different inactivity timer durations for different modes of operation of the network entity, and only one default BWP for the different modes of operation. In certain aspects, a UE is configured with only one inactivity timer duration for different modes of operation of the network entity, and different default BWPs for the different modes of operation. For example, in some aspects, BWP inactivity timer configuration information indicates a single inactivity timer duration (e.g., ServingCellConfig.bwp-InactivityTimer) for all of the plurality of modes of operation of the network entity. In certain aspects, a UE is configured with different inactivity timer durations for different modes of operation of the network entity, and different default BWPs for the different modes of operation.

Figure 7:
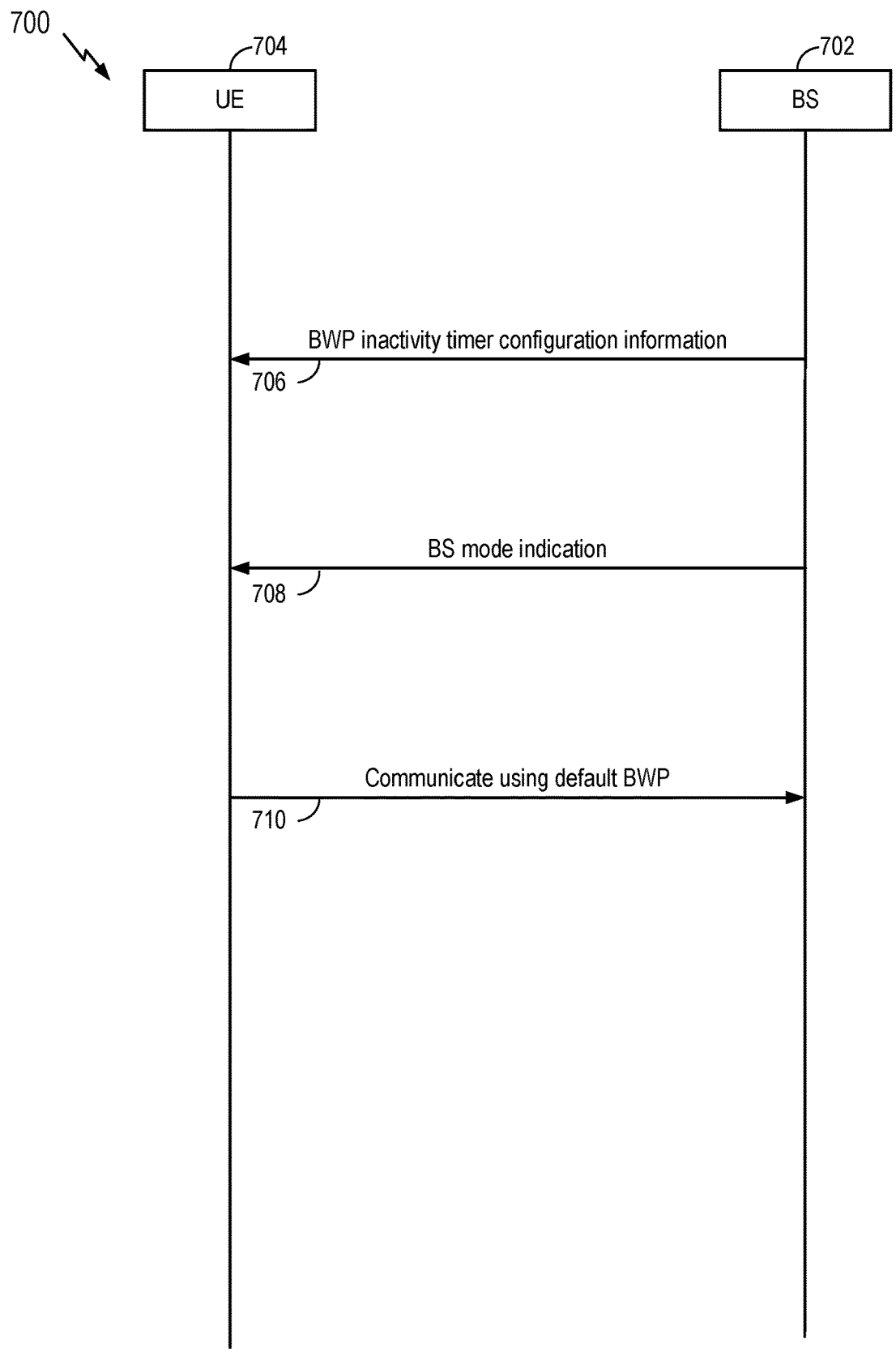
FIG. 7 depicts an example process flow for configuration of an inactivity timer at a UE.

FIG. 7 depicts a process flow 700 for configuration of an inactivity timer at a UE. In some aspects, the BS 702 may be an example of the BS 102 depicted and described with respect to FIGS. 1 and 3. Similarly, the UE 704 may be an example of UE 104 depicted and described with respect to FIGS. 1 and 3. However, in other aspects, UE 704 may be another type of wireless communications device and BS 702 may be another type of network entity or network node, such as those described herein. Although FIG. 7 illustrates one UE, the techniques disclosed herein can support any suitable number of UEs.

At 706, the BS 702 may send (e.g., directly or via one or more additional devices), to UE 704, BWP inactivity timer configuration information for a plurality of modes of operation of the BS 702. In certain aspects, the BWP inactivity timer configuration information indicates different inactivity timer durations for different modes of operation (e.g., each mode has a different inactivity timer duration; or one or more modes have a unique inactivity timer duration and one or more modes share an inactivity timer duration). For example, the plurality of modes may include a first mode and a second mode, and the BWP inactivity timer configuration information may indicate a first inactivity timer duration for the first mode and a second inactivity timer duration for the second mode.

In certain aspects, the BWP inactivity timer configuration information is sent together with default BWP configuration information. In certain aspects, BWP inactivity timer configuration information is sent to the UE 704 separately from default BWP configuration information. In certain aspects, only one of BWP inactivity timer configuration information or default BWP configuration information is sent to the UE 704.

In some aspects, the BWP inactivity timer configuration information can separately configure a corresponding inactivity timer duration for each of the plurality of modes of operation. For example, in certain aspects, the BWP inactivity timer configuration information includes a separate duration value for each of the plurality of modes of operation. In an example, the BWP inactivity timer configuration information may include a first duration value that independently indicates an inactivity timer duration for a first mode, and may include a second duration value that independently indicates an inactivity timer duration for a second mode.

In some aspects, the BWP inactivity timer configuration information configures a common inactivity timer duration for all of the plurality of modes of operation and a timer offset value for one or more of the plurality of modes (e.g., at least the second mode). For example, the common inactivity timer duration may define a base duration for all of the plurality of modes. Further, for one or more of the modes, the BWP inactivity timer configuration information may include a timer offset value that in combination with the common inactivity timer duration defines an inactivity timer duration for the mode. For example, assuming the common inactivity timer duration is X, and the timer offset value for a mode is Y, the inactivity timer duration for the mode may be X+Y. In some aspects, for some modes, the inactivity timer duration for the mode may be the same as the common inactivity timer duration when no offset value is included in the BWP inactivity timer configuration information for the mode.

Continuing at 708, BS 702 can send, to UE 704, a mode indication indicating the mode of operation of BS 702. In some aspects, the mode indication indicates that BS 702 is operating in the first mode (e.g., switching to operation in the first mode from prior operation in another mode). For example, the first mode may be first mode 612 shown in FIG. 6. In some aspects, the mode indication indicates that BS 702 is operating in the second mode. For example, the second mode is second mode 614 shown in FIG. 6.

At 710, UE 704 communicates with BS 702 using a default BWP, such as a default BWP associated with the mode indicated in the mode indication. For example, UE 704 may communicate with BS 702, which is operating in the first mode, using the first default BWP associated with the first mode.

In some aspects, prior to receiving the mode indication, UE 704 is communicating with the BS 702 using an active BWP, as in not a default BWP. The UE 704 may continue to communicate with the BS 702 using the active BWP after receiving the mode indication until expiration of an inactivity timer, as discussed.

In certain aspects, an inactivity timer starts after receiving the mode indication, while the BS 702 is operating in the first mode. Accordingly, as discussed, the inactivity timer may have a first inactivity timer duration, based on the first mode. After the first inactivity timer duration, the first inactivity timer may expire, and the UE 704 may communicate using a default BWP (e.g., associated with the first mode).

However, in some aspects, UE 704 receives the mode indication from BS 702 indicating a change in the mode of operation of BS 702, while an inactivity timer is already running at UE 704. For example, the BS 702 may be operating in the second mode, prior to sending the mode indication indicating the first mode to the UE 704. Further, the UE 704 may start an inactivity timer while the BS 702 is operating in the second mode, such as due to inactivity at the UE 704, as discussed. In particular, in certain aspects, the UE 704 starts the inactivity timer with the second inactivity timer duration while the BS 702 is operating in the second mode. Before the inactivity timer expires, meaning before the end of the second inactivity timer duration, BS 702 may send the mode indication indicating the BS 702 is switching its operation mode to the first mode. In certain aspects, when the inactivity timer that has started prior to a mode switch is running and there is a mode switch, expiration of the inactivity timer is based on one of the inactivity timer duration associated with the mode prior to the mode switch or the inactivity timer duration associated with the mode after the mode switch.

For the following examples, it can be assumed that the operation mode of the BS 702 prior to the sending of the mode indication at 708 is the second mode associated with the second inactivity timer duration, and that the operation mode of the BS 702 after the sending of the mode indication at 708 is the first mode associated with the first inactivity timer duration.

In certain aspects, upon receiving the mode indication, UE 504 resets the inactivity timer and the duration of the reset inactivity timer is set to the first inactivity timer duration. Accordingly, if the UE 504 remains inactive for the first inactivity timer duration after receiving the mode indication and resetting the inactivity timer, the inactivity timer expires, and the UE 504 communicates using a default BWP (e.g., associated with the first mode).

In certain other aspects, upon receiving the mode indication, UE 504 continues running the inactivity timer and maintains the second inactivity timer duration. Accordingly, if the inactivity timer expires after the second inactivity timer duration, the UE 504 communicates using a default BWP (e.g., associated with the first mode).

In certain other aspects, upon receiving the mode indication, UE 504 continues running the inactivity timer, but sets the duration of the inactivity timer to the greater of the first inactivity timer duration and the second inactivity timer duration. Accordingly, if the inactivity timer expires after the greater of the first inactivity timer duration and the second inactivity timer duration, the UE 504 communicates using a default BWP (e.g., associated with the first mode).

FIG. 8A-D depicts example scenarios of inactivity timer settings after receiving the mode indication. The example scenarios illustrate the modes of operation 610 of a network entity (e.g., BS 702), and the network entity can operate in modes other than the modes of operation 610. The example scenarios also illustrate a first timer 810 and a second timer 820 of a UE (e.g. UE 704). Although depicted as two separate timers, the first timer 810 and the second timer 820 can represent two different inactivity timer durations for the same inactivity timer.

In some aspects, the first timer 810 and the second timer 820 are configured according to the BWP inactivity timer configuration information received. In some aspects, the first timer 810 and the second timer 820 are configured separately with a corresponding inactivity timer duration for each of the plurality of modes of operation. For example, the first timer 810 has a first inactivity timer duration corresponding to the first mode 612 and the second timer 820 has a second inactivity timer duration corresponding to the second mode 614. In some aspects, the first timer 810 and the second timer 820 are configured according to a common inactivity timer duration for all of the plurality of modes of operation and timer offset values for the first mode 612 and the second mode 614, respectively. For example, the common inactivity timer duration is 1 ms, while the timer offset value for the first mode 612 is 0.5 ms while the timer offset value for the second mode 614 is −0.5 ms. Accordingly, in the example, the first inactivity timer duration is 1.5 ms while the second inactivity timer duration is 0.5 ms.

In the depiction, the first timer 810 and the second timer 820 can have lengths proportional to the inactivity timer durations they represent respectively. However, the first timer 810 and the second timer 820 can also represent inactivity timer durations not proportional to their lengths.

FIG. 8A depicts an example scenario where the first timer 810 is running when the mode indication 830 is received. Mode indication 830 can indicate that the network entity is operating in the second mode 614. Accordingly, the first timer 810 can reset (e.g., zeroed, stopped and/or deconstructed), while the second timer 820 starts to run. The UE can switch to the default BWP (e.g., associated with the second mode 614) when the second timer 820 expires.

FIG. 8B depicts an example scenario where the first timer 810 is running when the mode indication 830 is received. Mode indication 830 can indicate that the network entity is operating in the second mode 614. Accordingly, the first timer 810 can keep running until expiring at the first inactivity timer duration. The UE can switch to the default BWP (e.g., associated with the second mode 614) when the first timer 810 expires.

FIG. 8C depicts an example scenario where the first timer 810 is running when the mode indication 830 is received. Mode indication 830 can indicate that the network entity is operating in the second mode 614. Accordingly, the first timer 810 can keep running until expiring at the first inactivity timer duration. Additionally, the second timer 820 can start to run when the mode indication 830 is received. The second timer 820 may expire later than the first timer 810. The UE can switch to the default BWP (e.g., associated with the second mode 614) according to the later expiring timer of first timer 810 and second timer 820, which in this scenario is the second timer 820.

FIG. 8D depicts an example scenario where the first timer 810 is running when the mode indication 830 is received. Mode indication 830 can indicate that the network entity is operating in the second mode 614. Accordingly, the first timer 810 can keep running until expiring at the first inactivity timer duration. Additionally, the second timer 820 can start to run when the mode indication 830 is received. The first timer 810 may expire later than the second timer 820. The UE can switch to the default BWP (e.g., associated with the second mode 614) according to the later expiring timer of first timer 810 and second timer 820, which in this scenario is the first timer 810.

Example Operations of User Equipment

Figure 9:
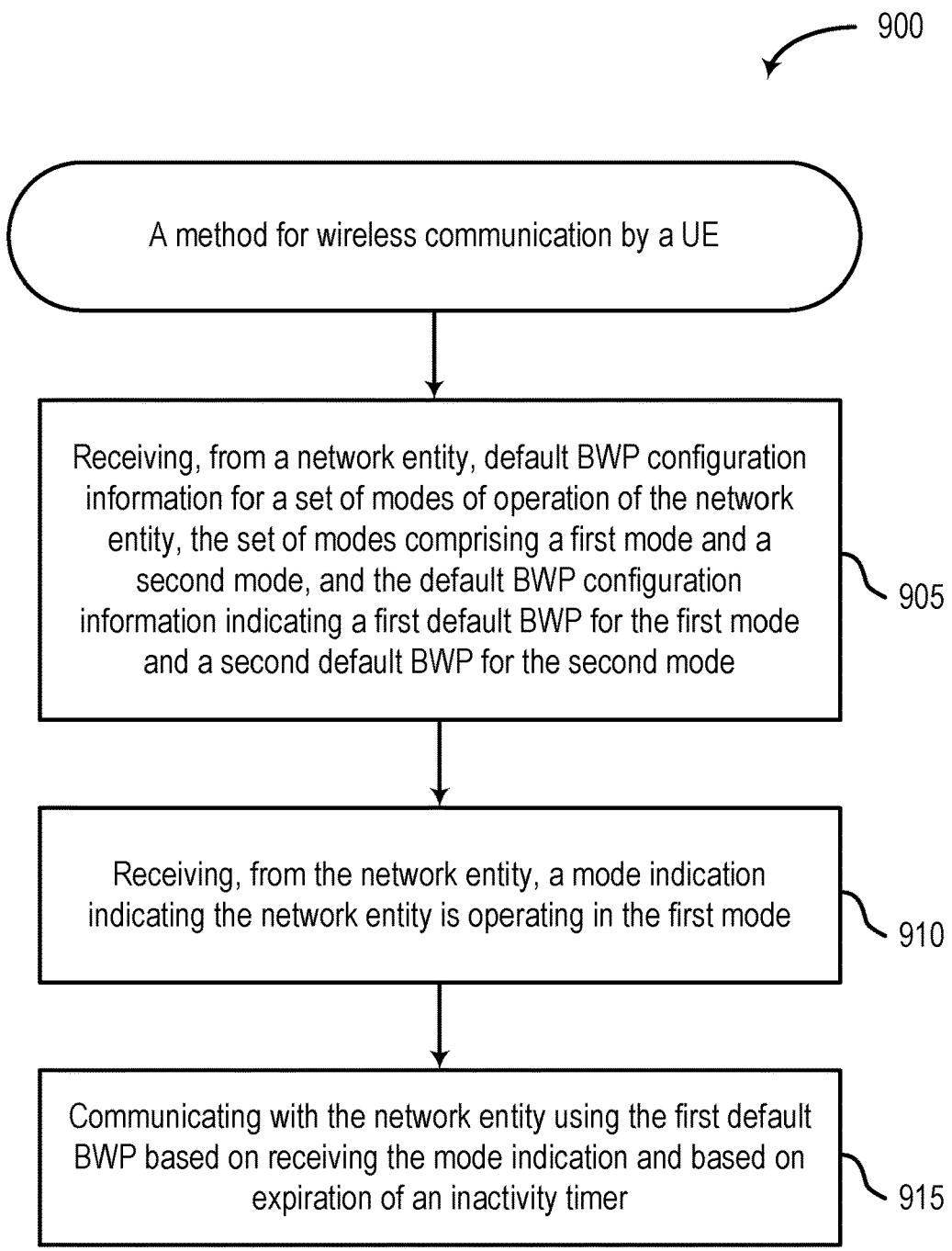
FIG. 9 depicts a method for wireless communications.

FIG. 9 shows a method 900 for wireless communications by a UE, such as UE 104 of FIGS. 1 and 3.

Method 900 begins at 905 with receiving, from a network entity, default BWP configuration information for a set of modes of operation of the network entity, the set of modes comprising a first mode and a second mode, and the default BWP configuration information indicating a first default BWP for the first mode and a second default BWP for the second mode. In some cases, the operations of this step refer to, or may be performed by, default BWP configuration circuitry as described with reference to FIG. 13.

Method 900 then proceeds to step 910 with receiving, from the network entity, a mode indication indicating the network entity is operating in the first mode. In some cases, the operations of this step refer to, or may be performed by, operation mode processing circuitry as described with reference to FIG. 13.

Method 900 then proceeds to step 915 with communicating with the network entity using the first default BWP based on receiving the mode indication and based on expiration of an inactivity timer. In some cases, the operations of this step refer to, or may be performed by, communications circuitry as described with reference to FIG. 13.

Various aspects relate to the method 900, including the following aspects.

In some aspects, the default BWP configuration information comprises a separate default BWP configuration for each of the plurality of modes of operation.

In some aspects, the default BWP configuration information comprises a common default BWP configuration for all of the plurality of modes of operation and a dedicated default BWP configuration for at least the second mode. In some aspects, the second default BWP is based on the common default BWP configuration and the dedicated default BWP configuration. In some aspects, the common default BWP configuration includes a first set of parameters and the dedicated default BWP configuration includes a second set of parameters different from the first set of parameters. In some aspects, the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

In some aspects, the first default BWP has a first frequency bandwidth, a first starting frequency, a first numerology, and a first search space. In some aspects, the first mode comprises using a first number of antennas, a first transmit power, or a first bandwidth for communicating.

In some aspects, method 900 further includes communicating with the network entity using a first active BWP after receiving the mode indication and prior to the expiration of the inactivity timer.

Figure 13:
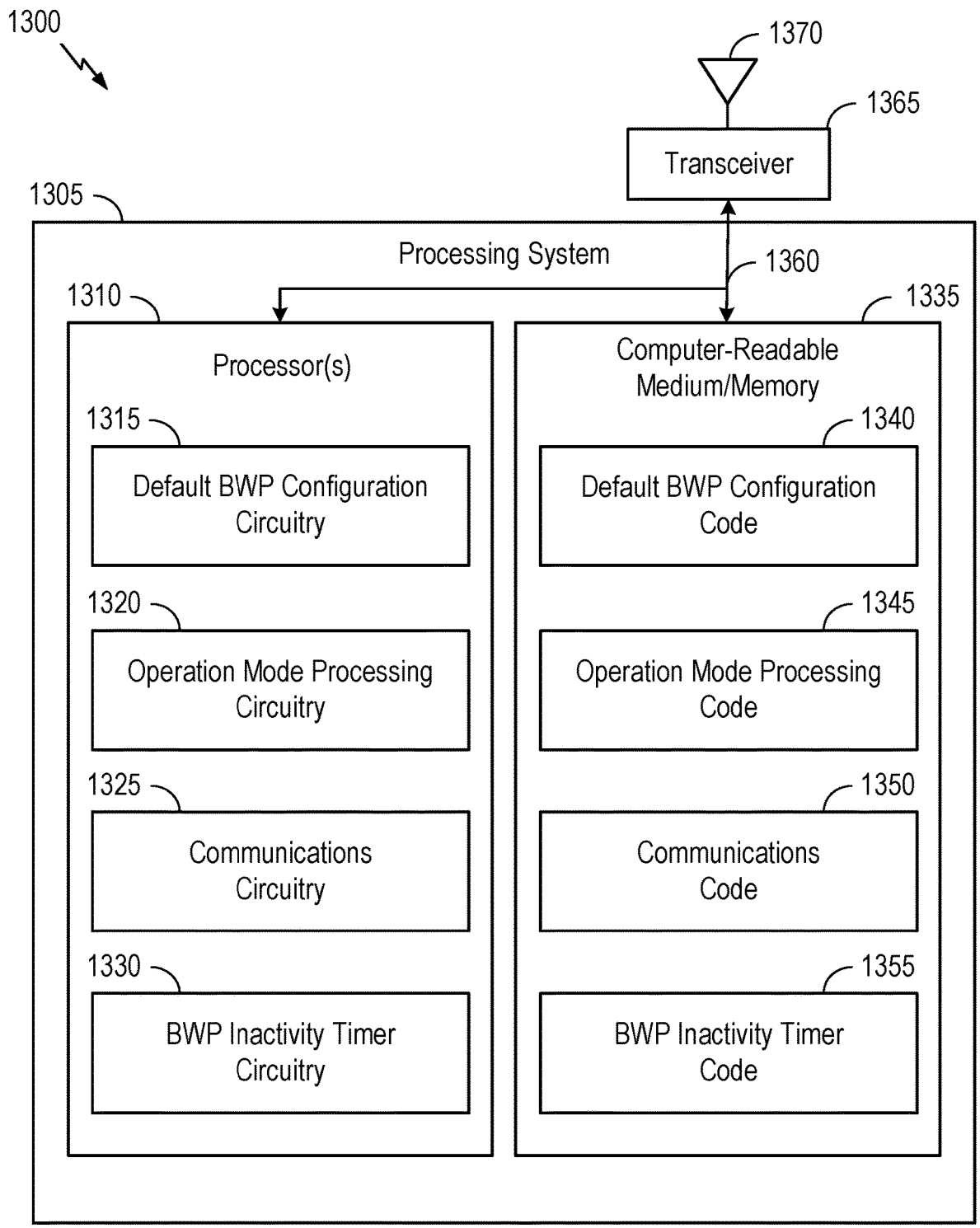
FIG. 13 depicts aspects of an example communications device.

In one aspect, method 900, or any aspect related to it, may be performed by an apparatus, such as communications device 1300 of FIG. 13, which includes various components operable, configured, or adapted to perform the method 900. Communications device 1300 is described below in further detail.

Note that FIG. 9 is just one example of a method, and other methods including fewer, additional, or alternative steps are possible consistent with this disclosure.

Figure 10:
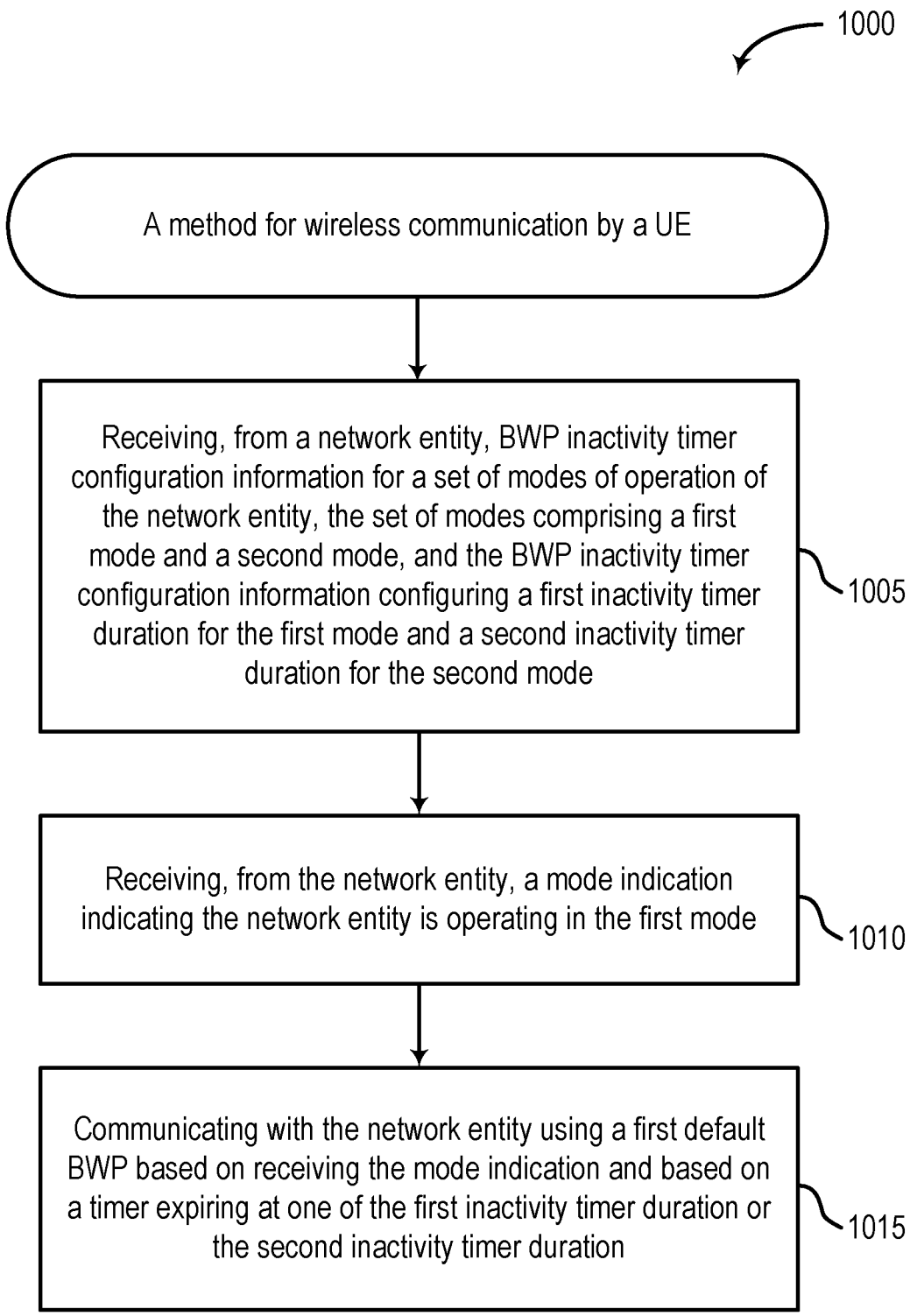
FIG. 10 depicts a method for wireless communications.

FIG. 10 shows a method 1000 for wireless communications by a UE, such as UE 104 of FIGS. 1 and 3.

Method 1000 begins at 1005 with receiving, from a network entity, BWP inactivity timer configuration information for a set of modes of operation of the network entity, the set of modes comprising a first mode and a second mode, and the BWP inactivity timer configuration information configuring a first inactivity timer duration for the first mode and a second inactivity timer duration for the second mode. In some cases, the operations of this step refer to, or may be performed by, BWP inactivity timer circuitry as described with reference to FIG. 13.

Method 1000 then proceeds to step 1010 with receiving, from the network entity, a mode indication indicating the network entity is operating in the first mode. In some cases, the operations of this step refer to, or may be performed by, operation mode processing circuitry as described with reference to FIG. 13.

Method 1000 then proceeds to step 1015 with communicating with the network entity using a first default BWP based on receiving the mode indication and based on a timer expiring at one of the first inactivity timer duration or the second inactivity timer duration. In some cases, the operations of this step refer to, or may be performed by, communications circuitry as described with reference to FIG. 13.

Various aspects relate to the method 1000, including the following aspects.

In some aspects, the BWP inactivity timer configuration information separately configures a corresponding inactivity timer duration for each of the plurality of modes of operation. In some aspects, the BWP inactivity timer configuration information configures a common inactivity timer duration for all of the plurality of modes of operation and a timer offset value for at least the second mode, wherein the second inactivity timer duration is based on the common inactivity timer duration and the timer offset value.

In some aspects, the mode indication is received while the timer is running and the network entity is operating in the second mode, and wherein the timer expiring at the one of the first inactivity timer duration or the second inactivity timer duration comprises the timer expiring at the first inactivity timer duration. In some aspects, method 1000 further includes resetting the timer after receiving the mode indication.

In some aspects, the mode indication is received while the timer is running and the network entity is operating in the second mode, wherein the timer expiring at the one of the first inactivity timer duration or the second inactivity timer duration comprises the timer expiring at the second inactivity timer duration. In some aspects, the mode indication is received while the timer is running and the network entity is operating in the second mode, wherein the timer expiring at the one of the first inactivity timer duration or the second inactivity timer duration comprises the timer expiring at the greater of the first inactivity timer duration and the second inactivity timer duration.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Example Operations of Network Entities

Figure 11:
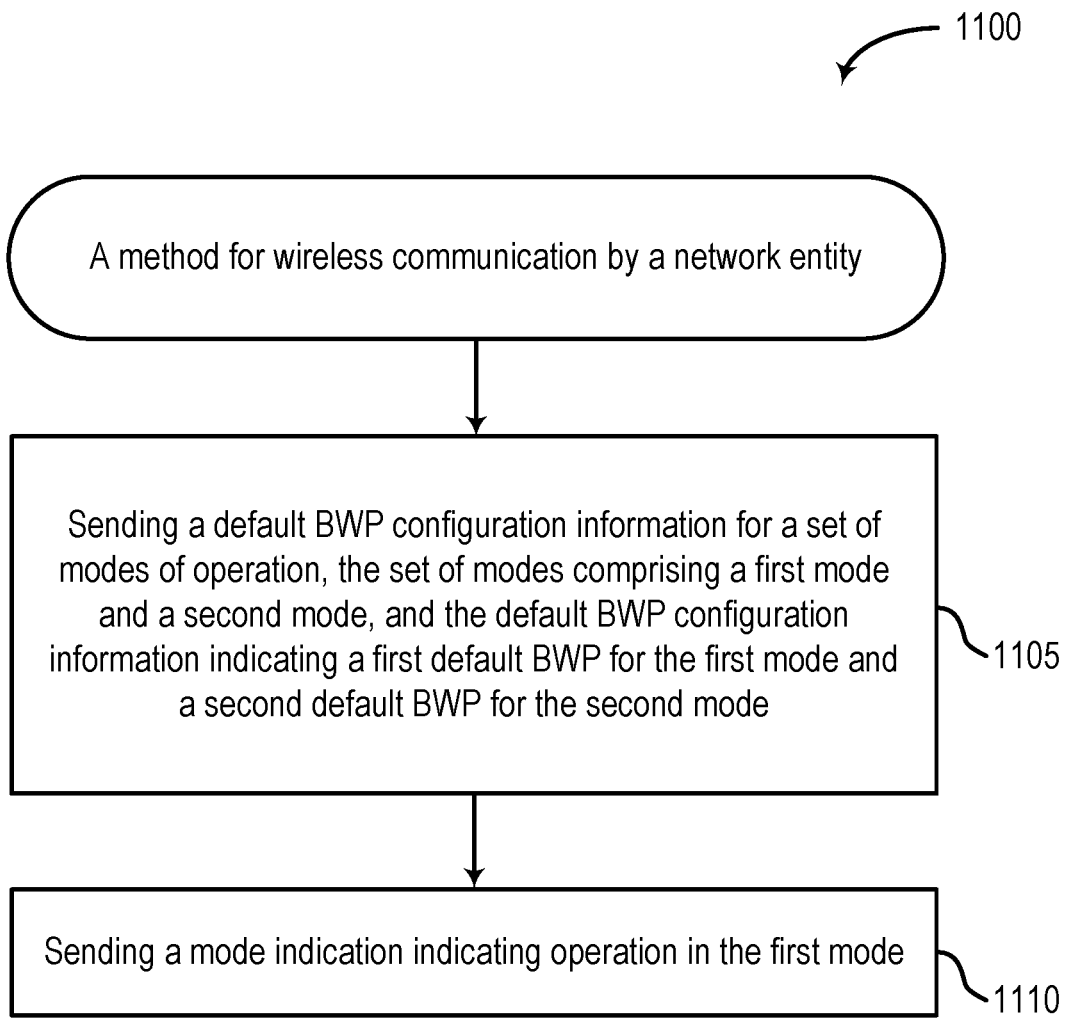
FIG. 11 depicts a method for wireless communications.

FIG. 11 shows a method 1100 for wireless communications by a network entity, such as BS 102 of FIGS. 1 and 3, or a disaggregated base station as discussed with respect to FIG. 2.

Method 1100 begins at 1105 with sending a default BWP configuration information for a set of modes of operation, the set of modes comprising a first mode and a second mode, and the default BWP configuration information indicating a first default BWP for the first mode and a second default BWP for the second mode. In some cases, the operations of this step refer to, or may be performed by, BWP configuration circuitry as described with reference to FIG. 14.

Method 1100 then proceeds to step 1110 with sending a mode indication indicating operation in the first mode. In some cases, the operations of this step refer to, or may be performed by, operation mode indication circuitry as described with reference to FIG. 14.

Various aspects relate to the method 1100, including the following aspects.

In some aspects, method 1100 further includes communicating with a UE using the first default BWP. In some aspects, the default BWP configuration information comprises a separate default BWP configuration for each of the plurality of modes of operation.

In some aspects, the default BWP configuration information comprises a common default BWP configuration for all of the plurality of modes of operation and a dedicated default BWP configuration for at least the second mode. In some aspects, the second default BWP is based on the common default BWP configuration and the dedicated default BWP configuration. In some aspects, the common default BWP configuration includes a first set of parameters and the dedicated default BWP configuration includes a second set of parameters different from the first set of parameters. In some aspects, the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

In some aspects, the first default BWP has a first frequency bandwidth, a first starting frequency, a first numerology, and a first search space. In some aspects, the first mode comprises using a first number of antennas, a first transmit power, or a first bandwidth for communicating.

Figure 14:
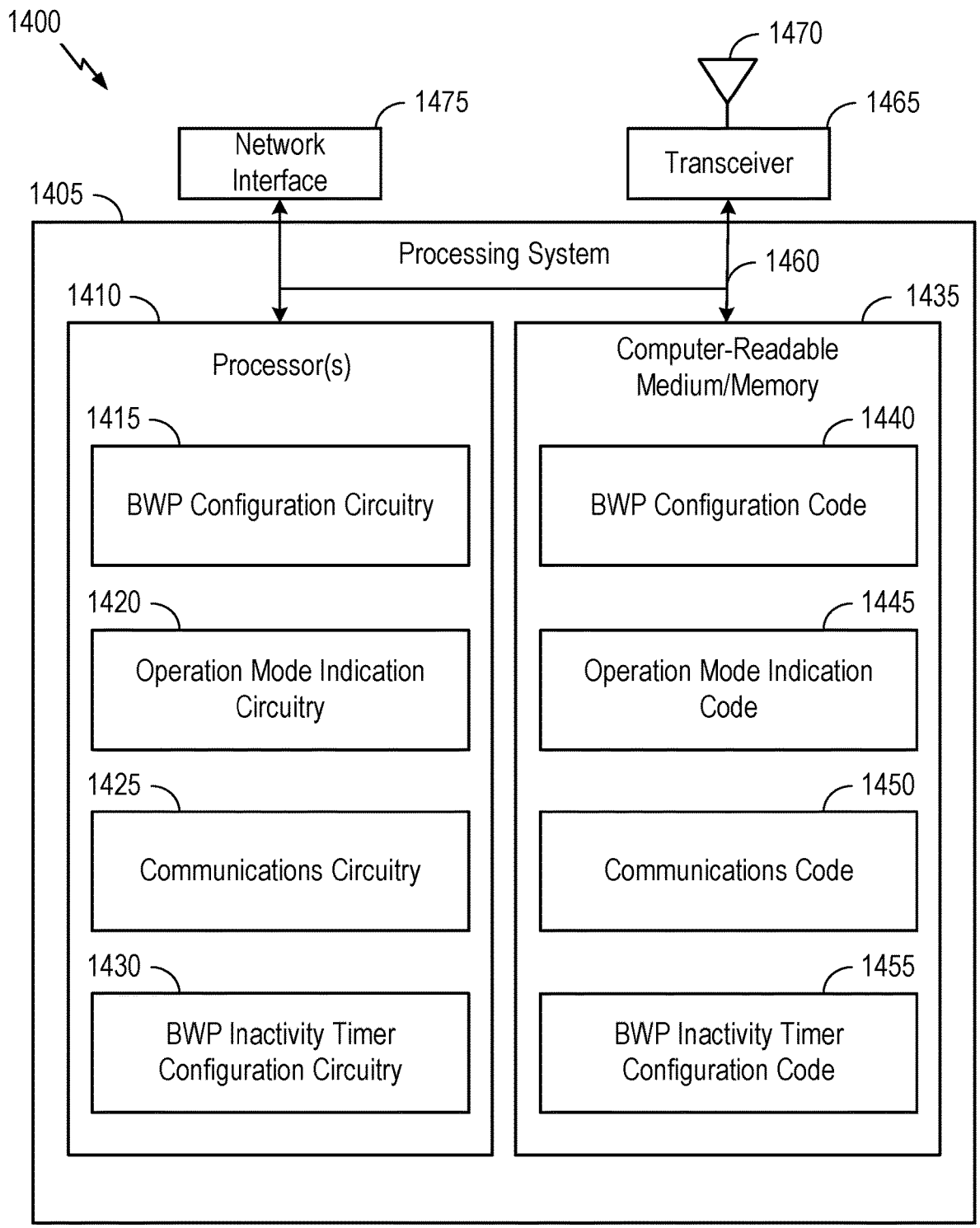
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Figure 12:
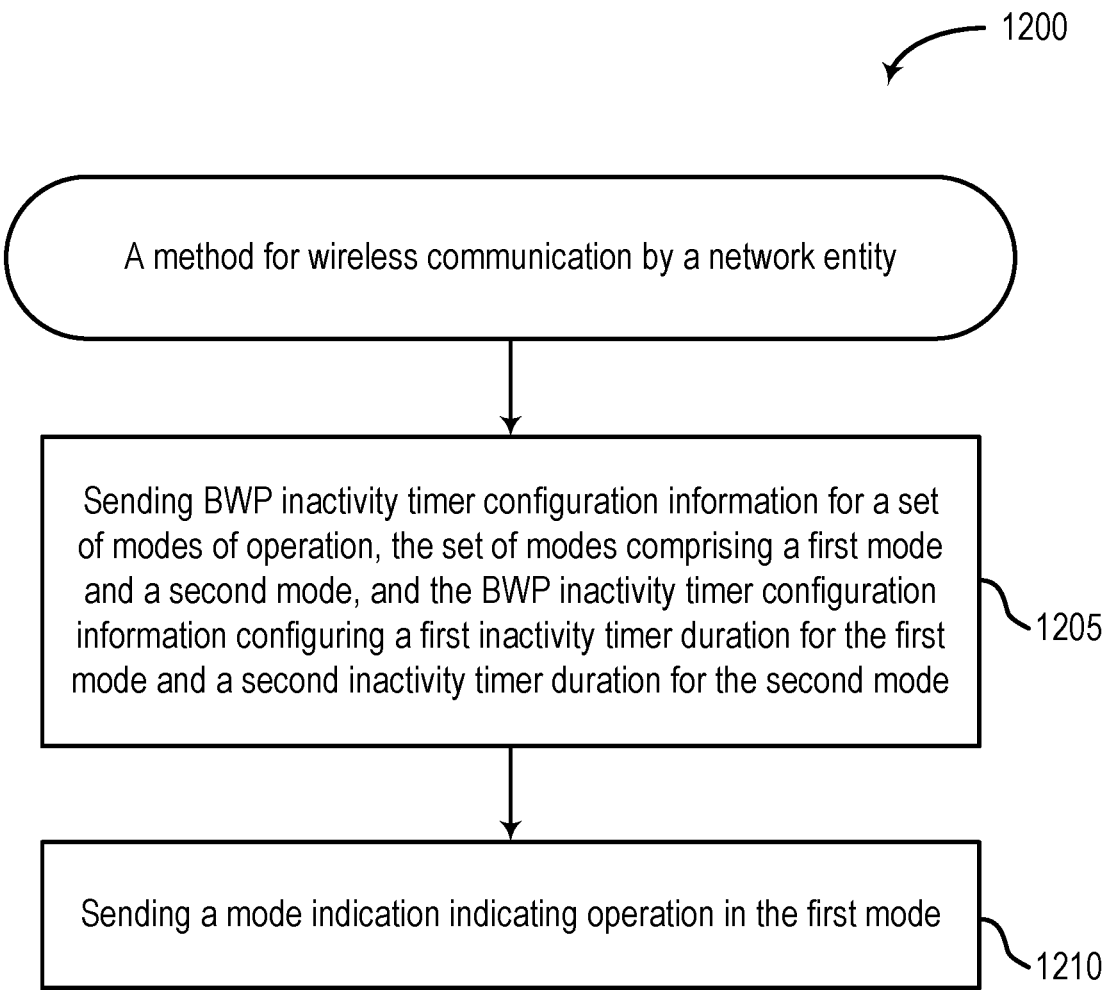
FIG. 12 depicts a method for wireless communications.

FIG. 12 shows a method 1200 for wireless communications by a network entity, such as BS 102 of FIGS. 1 and 3, or a disaggregated base station as discussed with respect to FIG. 2.

Method 1200 begins at 1205 with sending BWP inactivity timer configuration information for a set of modes of operation, the set of modes comprising a first mode and a second mode, and the BWP inactivity timer configuration information configuring a first inactivity timer duration for the first mode and a second inactivity timer duration for the second mode. In some cases, the operations of this step refer to, or may be performed by, BWP inactivity timer configuration circuitry as described with reference to FIG. 14.

Method 1200 then proceeds to step 1210 with sending a mode indication indicating operation in the first mode. In some cases, the operations of this step refer to, or may be performed by, operation mode indication circuitry as described with reference to FIG. 14.

Various aspects relate to the method 1200, including the following aspects.

In some aspects, method 1200 further includes communicating with a UE using a first default BWP based on a timer expiring at one of the first inactivity timer duration or the second inactivity timer duration. In some aspects, the BWP inactivity timer configuration information separately configures a corresponding inactivity timer duration for each of the plurality of modes of operation. In some aspects, the BWP inactivity timer configuration information configures a common inactivity timer duration for all of the plurality of modes of operation and a timer offset value for at least the second mode, wherein the second inactivity timer duration is based on the common inactivity timer duration and the timer offset value.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to the transceiver 1365 (e.g., a transmitter and/or a receiver). The transceiver 1365 is configured to transmit and receive signals for the communications device 1300 via the antenna 1370, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1335 via a bus 1360. In certain aspects, the computer-readable medium/memory 1335 is configured to store instructions (e.g., computer-executable code) that when executed by the one or more processors 1310, cause the one or more processors 1310 to perform the method 900 and/or the method 1000 described with respect to FIG. 9 and FIG. 10, respectively, or any aspect related to them. Note that reference to a processor performing a function of communications device 1300 may include one or more processors 1310 performing that function of communications device 1300.

In the depicted example, computer-readable medium/memory 1335 stores code (e.g., executable instructions), such as default BWP configuration code 1340, operation mode processing code 1345, communications code 1350, and BWP inactivity timer code 1355. Processing of the default BWP configuration code 1340, operation mode processing code 1345, communications code 1350, and BWP inactivity timer code 1355 may cause the communications device 1300 to perform the method 900 and/or the method 1000 described with respect to FIG. 9 and FIG. 10, respectively, or any aspect related to them.

The one or more processors 1310 include circuitry configured to implement (e.g., execute) the code stored in the computer-readable medium/memory 1335, including circuitry such as default BWP configuration circuitry 1315, operation mode processing circuitry 1320, communications circuitry 1325, and BWP inactivity timer circuitry 1330. Processing with default BWP configuration circuitry 1315, operation mode processing circuitry 1320, communications circuitry 1325, and BWP inactivity timer circuitry 1330 may cause the communications device 1300 to perform the method 900 and/or the method 1000 described with respect to FIG. 9 and FIG. 10, respectively, or any aspect related to them.

Various components of the communications device 1300 may provide means for performing the method 900 and/or the method 1000 described with respect to FIG. 9 and FIG. 10, respectively, or any aspect related to them. For example, means for transmitting, sending or outputting for transmission may include transceivers 354 and/or antenna(s) 352 of the UE 104 illustrated in FIG. 3 and/or the transceiver 1365 and the antenna 1370 of the communications device 1300 in FIG. 13. Means for receiving or obtaining may include transceivers 354 and/or antenna(s) 352 of the UE 104 illustrated in FIG. 3 and/or the transceiver 1365 and the antenna 1370 of the communications device 1300 in FIG. 13.

According to some aspects, default BWP configuration circuitry 1315 receives, from a network entity, default BWP configuration information for a set of modes of operation of the network entity, the set of modes comprising a first mode and a second mode, and the default BWP configuration information indicating a first default BWP for the first mode and a second default BWP for the second mode. According to some aspects, operation mode processing circuitry 1320 receives, from the network entity, a mode indication indicating the network entity is operating in the first mode. According to some aspects, communications circuitry 1325 communicates with the network entity using the first default BWP based on receiving the mode indication and based on expiration of an inactivity timer.

In some aspects, the default BWP configuration information comprises a separate default BWP configuration for each of the set of modes of operation. In some aspects, the default BWP configuration information comprises a common default BWP configuration for all of the set of modes of operation and a dedicated default BWP configuration for at least the second mode. In some aspects, the second default BWP is based on the common default BWP configuration and the dedicated default BWP configuration. In some aspects, the common default BWP configuration includes a first set of parameters and the dedicated default BWP configuration includes a second set of parameters different from the first set of parameters. In some aspects, the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters. In some aspects, the first default BWP has a first frequency bandwidth, a first starting frequency, a first numerology, and a first search space. In some aspects, the first mode comprises using a first number of antennas, a first transmit power, or a first bandwidth for communicating. In some examples, communications circuitry 1325 communicates with the network entity using a first active BWP after receiving the mode indication and prior to the expiration of the inactivity timer.

According to some aspects, BWP inactivity timer circuitry 1330 receives, from a network entity, BWP inactivity timer configuration information for a set of modes of operation of the network entity, the set of modes comprising a first mode and a second mode, and the BWP inactivity timer configuration information configuring a first inactivity timer duration for the first mode and a second inactivity timer duration for the second mode. In some examples, communications circuitry 1325 communicates with the network entity using a first default BWP based on receiving the mode indication and based on a timer expiring at one of the first inactivity timer duration or the second inactivity timer duration.

In some aspects, the BWP inactivity timer configuration information separately configures a corresponding inactivity timer duration for each of the set of modes of operation. In some aspects, the BWP inactivity timer configuration information configures a common inactivity timer duration for all of the set of modes of operation and a timer offset value for at least the second mode, wherein the second inactivity timer duration is based on the common inactivity timer duration and the timer offset value.

In some aspects, the mode indication is received while the timer is running and the network entity is operating in the second mode, wherein the timer expiring at the one of the first inactivity timer duration or the second inactivity timer duration comprises the timer expiring at the first inactivity timer duration, and BWP inactivity timer circuitry 1330 resets the timer after receiving the mode indication. In some aspects, the mode indication is received while the timer is running and the network entity is operating in the second mode, wherein the timer expiring at the one of the first inactivity timer duration or the second inactivity timer duration comprises the timer expiring at the second inactivity timer duration. In some aspects, the mode indication is received while the timer is running and the network entity is operating in the second mode, wherein the timer expiring at the one of the first inactivity timer duration or the second inactivity timer duration comprises the timer expiring at the greater of the first inactivity timer duration and the second inactivity timer duration.

FIG. 14 depicts aspects of an example communications device 1400. In some aspects, communications device 1400 is a network entity, such as BS 102 described above with respect to FIGS. 1 and 3.

The communications device 1400 includes a processing system 1405 coupled to the transceiver 1465 (e.g., a transmitter and/or a receiver) and/or a network interface 1475. The transceiver 1465 is configured to transmit and receive signals for the communications device 1400 via the antenna 1470, such as the various signals as described herein. The network interface 1475 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1100 and/or the method 1200 described with respect to FIG. 11 and FIG. 12, respectively, or any aspect related to them. Note that reference to a processor of communications device 1400 performing a function may include one or more processors 1410 of communications device 1400 performing that function.

In the depicted example, the computer-readable medium/memory 1435 stores code (e.g., executable instructions), such as BWP configuration code 1440, operation mode indication code 1445, communications code 1450, and BWP inactivity timer configuration code 1455. Processing of the BWP configuration code 1440, operation mode indication code 1445, communications code 1450, and BWP inactivity timer configuration code 1455 may cause the communications device 1400 to perform the method 1100 and/or the method 1200 described with respect to FIG. 11 and FIG. 12, respectively, or any aspect related to them.

The one or more processors 1410 include circuitry configured to implement (e.g., execute) the code stored in the computer-readable medium/memory 1435, including circuitry such as BWP configuration circuitry 1415, operation mode indication circuitry 1420, communications circuitry 1425, and BWP inactivity timer configuration circuitry 1430. Processing with BWP configuration circuitry 1415, operation mode indication circuitry 1420, communications circuitry 1425, and BWP inactivity timer configuration circuitry 1430 may cause the communications device 1400 to perform the method 1100 and/or the method 1200 described with respect to FIG. 11 and FIG. 12, respectively, or any aspect related to them.

Various components of the communications device 1400 may provide means for performing the method 1100 and/or the method 1200 described with respect to FIG. 11 and FIG. 12, respectively, or any aspect related to them. Means for transmitting, sending or outputting for transmission may include transceivers 332 and/or antenna(s) 334 of the BS 102 illustrated in FIG. 3 and/or the transceiver 1465 and the antenna 1470 of the communications device 1400 in FIG. 14. Means for receiving or obtaining may include transceivers 332 and/or antenna(s) 334 of the BS 102 illustrated in FIG. 3 and/or the transceiver 1465 and the antenna 1470 of the communications device 1400 in FIG. 14.

According to some aspects, BWP configuration circuitry 1415 sends a default BWP configuration information for a set of modes of operation, the set of modes comprising a first mode and a second mode, and the default BWP configuration information indicating a first default BWP for the first mode and a second default BWP for the second mode. According to some aspects, operation mode indication circuitry 1420 sends a mode indication indicating operation in the first mode. According to some aspects, communications circuitry 1425 communicates with a UE using the first default BWP.

In some aspects, the default BWP configuration information comprises a separate default BWP configuration for each of the set of modes of operation. In some aspects, the default BWP configuration information comprises a common default BWP configuration for all of the set of modes of operation and a dedicated default BWP configuration for at least the second mode. In some aspects, the second default BWP is based on the common default BWP configuration and the dedicated default BWP configuration. In some aspects, the common default BWP configuration includes a first set of parameters and the dedicated default BWP configuration includes a second set of parameters different from the first set of parameters. In some aspects, the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters. In some aspects, the first default BWP has a first frequency bandwidth, a first starting frequency, a first numerology, and a first search space. In some aspects, the first mode comprises using a first number of antennas, a first transmit power, or a first bandwidth for communicating.

According to some aspects, BWP inactivity timer configuration circuitry 1430 sends BWP inactivity timer configuration information for a set of modes of operation, the set of modes comprising a first mode and a second mode, and the BWP inactivity timer configuration information configuring a first inactivity timer duration for the first mode and a second inactivity timer duration for the second mode. In some examples, communications circuitry 1425 communicates with a UE using a first default BWP based on a timer expiring at one of the first inactivity timer duration or the second inactivity timer duration.

In some aspects, the BWP inactivity timer configuration information separately configures a corresponding inactivity timer duration for each of the set of modes of operation. In some aspects, the BWP inactivity timer configuration information configures a common inactivity timer duration for all of the set of modes of operation and a timer offset value for at least the second mode, wherein the second inactivity timer duration is based on the common inactivity timer duration and the timer offset value.

Example Clauses

Implementation examples are described in the following numbered clauses:

Clause 1: A method wireless communication by a UE, comprising: receiving, from a network entity, default BWP configuration information for a plurality of modes of operation of the network entity, the plurality of modes comprising a first mode and a second mode, and the default BWP configuration information indicating a first default BWP for the first mode and a second default BWP for the second mode; receiving, from the network entity, a mode indication indicating the network entity is operating in the first mode; and communicating with the network entity using the first default BWP based on receiving the mode indication and based on expiration of an inactivity timer.

Clause 2: The method of Clause 1, wherein the default BWP configuration information comprises a separate default BWP configuration for each of the plurality of modes of operation.

Clause 3: The method of any one of Clauses 1 and 2, wherein the default BWP configuration information comprises a common default BWP configuration for all of the plurality of modes of operation and a dedicated default BWP configuration for at least the second mode.

Clause 4: The method of Clause 3, wherein the second default BWP is based on the common default BWP configuration and the dedicated default BWP configuration.

Clause 5: The method of Clause 3, wherein the common default BWP configuration includes a first set of parameters and the dedicated default BWP configuration includes a second set of parameters different from the first set of parameters.

Clause 6: The method of Clause 3, wherein the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

Clause 7: The method of any one of Clauses 1-6, wherein the first default BWP has a first frequency bandwidth, a first starting frequency, a first numerology, and a first search space.

Clause 8: The method of any one of Clauses 1-7, wherein the first mode comprises using a first number of antennas, a first transmit power, or a first bandwidth for communicating.

Clause 9: The method of any one of Clauses 1-8, further comprising: communicating with the network entity using a first active BWP after receiving the mode indication and prior to the expiration of the inactivity timer.

Clause 10: A method for wireless communication by a UE, comprising: receiving, from a network entity, BWP inactivity timer configuration information for a plurality of modes of operation of the network entity, the plurality of modes comprising a first mode and a second mode, and the BWP inactivity timer configuration information configuring a first inactivity timer duration for the first mode and a second inactivity timer duration for the second mode;

receiving, from the network entity, a mode indication indicating the network entity is operating in the first mode; and communicating with the network entity using a first default BWP based on receiving the mode indication and based on a timer expiring at one of the first inactivity timer duration or the second inactivity timer duration.

Clause 11: The method of Clause 10, wherein the BWP inactivity timer configuration information separately configures a corresponding inactivity timer duration for each of the plurality of modes of operation.

Clause 12: The method of any one of Clauses 10 and 11, wherein the BWP inactivity timer configuration information configures a common inactivity timer duration for all of the plurality of modes of operation and a timer offset value for at least the second mode, wherein the second inactivity timer duration is based on the common inactivity timer duration and the timer offset value.

Clause 13: The method of any one of Clauses 10-12, wherein the mode indication is received while the timer is running and the network entity is operating in the second mode, wherein the timer expiring at the one of the first inactivity timer duration or the second inactivity timer duration comprises the timer expiring at the first inactivity timer duration, and further comprising resetting the timer after receiving the mode indication.

Clause 14: The method of any one of Clauses 10-13, wherein the mode indication is received while the timer is running and the network entity is operating in the second mode, wherein the timer expiring at the one of the first inactivity timer duration or the second inactivity timer duration comprises the timer expiring at the second inactivity timer duration.

Clause 15: The method of any one of Clauses 10-14, wherein the mode indication is received while the timer is running and the network entity is operating in the second mode, wherein the timer expiring at the one of the first inactivity timer duration or the second inactivity timer duration comprises the timer expiring at the greater of the first inactivity timer duration and the second inactivity timer duration.

Clause 16: A method for wireless communication by a network entity, comprising: sending a default BWP configuration information for a plurality of modes of operation, the plurality of modes comprising a first mode and a second mode, and the default BWP configuration information indicating a first default BWP for the first mode and a second default BWP for the second mode; and sending a mode indication indicating operation in the first mode.

Clause 17: The method of Clause 16, further comprising: communicating with a UE using the first default BWP.

Clause 18: The method of any one of Clauses 16 and 17, wherein the default BWP configuration information comprises a separate default BWP configuration for each of the plurality of modes of operation.

Clause 19: The method of any one of Clauses 16-18, wherein the default BWP configuration information comprises a common default BWP configuration for all of the plurality of modes of operation and a dedicated default BWP configuration for at least the second mode.

Clause 20: The method of Clause 19, wherein the second default BWP is based on the common default BWP configuration and the dedicated default BWP configuration.

Clause 21: The method of Clause 19, wherein the common default BWP configuration includes a first set of parameters and the dedicated default BWP configuration includes a second set of parameters different from the first set of parameters.

Clause 22: The method of Clause 19, wherein the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

Clause 23: The method of any one of Clauses 16-22, wherein the first default BWP has a first frequency bandwidth, a first starting frequency, a first numerology, and a first search space.

Clause 24: The method of any one of Clauses 16-23, wherein the first mode comprises using a first number of antennas, a first transmit power, or a first bandwidth for communicating.

Clause 25: A method for wireless communication by a network entity, comprising: sending BWP inactivity timer configuration information for a plurality of modes of operation, the plurality of modes comprising a first mode and a second mode, and the BWP inactivity timer configuration information configuring a first inactivity timer duration for the first mode and a second inactivity timer duration for the second mode; and sending a mode indication indicating operation in the first mode.

Clause 26: The method of Clause 25, further comprising: communicating with a UE using a first default BWP based on a timer expiring at one of the first inactivity timer duration or the second inactivity timer duration.

Clause 27: The method of any one of Clauses 25 and 26, wherein the BWP inactivity timer configuration information separately configures a corresponding inactivity timer duration for each of the plurality of modes of operation.

Clause 28: The method of any one of Clauses 25-27, wherein the BWP inactivity timer configuration information configures a common inactivity timer duration for all of the plurality of modes of operation and a timer offset value for at least the second mode, wherein the second inactivity timer duration is based on the common inactivity timer duration and the timer offset value.

Clause 29: A processing system, comprising: a memory comprising computer-executable instructions; one or more processors configured to execute the computer-executable instructions and cause the processing system to perform a method in accordance with any one of Clauses 1-28.

Clause 30: A processing system, comprising means for performing a method in accordance with any one of Clauses 1-28.

Clause 31: A non-transitory computer-readable medium comprising computer-executable instructions that, when executed by one or more processors of a processing system, cause the processing system to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) configured for wireless communication, comprising: a memory comprising computer-executable instructions; and one or more processors configured to execute the computer-executable instructions and cause the UE to:
   receive, from a network entity, default bandwidth part (BWP) configuration information for a plurality of modes of operation of the network entity, the plurality of modes comprising a first mode and a second mode, and the default BWP configuration information indicating a first default BWP for the first mode associated with a first number of active antennas of the UE and a second default BWP for the second mode associated with a second number of active antennas of the UE, wherein the default BWP configuration information indicates that the first default BWP is to be used on expiration of an inactivity timer when the network entity is operating in the first mode and that the second default BWP is to be used on expiration of the inactivity timer when the network entity is operating in the second mode;
   receive, from the network entity, a mode indication indicating the network entity is operating in the first mode; and
   communicate with the network entity using the first default BWP based on receiving the mode indication and based on expiration of the inactivity timer.

2. The UE of claim 1, wherein the default BWP configuration information comprises a separate default BWP configuration for each of the plurality of modes of operation.

3. The UE of claim 1, wherein the default BWP configuration information comprises a common default BWP configuration for all of the plurality of modes of operation and a dedicated default BWP configuration for at least the second mode.

4. The UE of claim 3, wherein the second default BWP is based on the common default BWP configuration and the dedicated default BWP configuration.

5. The UE of claim 3, wherein the common default BWP configuration includes a first set of parameters and the dedicated default BWP configuration includes a second set of parameters different from the first set of parameters.

6. The UE of claim 3, wherein the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

7. The UE of claim 1, wherein the first default BWP has a first frequency bandwidth, a first starting frequency, a first numerology, and a first search space.

8. The UE of claim 1, wherein the first mode comprises using a first transmit power, or a first bandwidth for communicating.

9. The UE of claim 1, wherein the one or more processors are configured to execute the computer-executable instructions and further cause the UE to:
communicate with the network entity using a first active BWP after receiving the mode indication and prior to the expiration of the inactivity timer.

10. A user equipment (UE) configured for wireless communication, comprising: a memory comprising computer-executable instructions; and one or more processors configured to execute the computer-executable instructions and cause the UE to:
receive, from a network entity, bandwidth part (BWP) inactivity timer configuration information for a plurality of modes of operation of the network entity, the plurality of modes comprising a first mode associated with a first number of active antennas and a second mode associated with a second number of active antennas, and the BWP inactivity timer configuration information configuring a first inactivity timer duration for the first mode and a second inactivity timer duration for the second mode, wherein default BWP configuration information indicates that a first default BWP is to be used on expiration of a timer when the network entity is operating in the first mode and that a second default BWP is to be used on expiration of the timer when the network entity is operating in the second mode;
receive, from the network entity, a mode indication indicating the network entity is operating in the first mode; and
communicate with the network entity using a first default BWP based on receiving the mode indication and based on the timer expiring at one of the first inactivity timer duration or the second inactivity timer duration.

11. The UE of claim 10, wherein the BWP inactivity timer configuration information separately configures a corresponding inactivity timer duration for each of the plurality of modes of operation.

12. The UE of claim 10, wherein the BWP inactivity timer configuration information configures a common inactivity timer duration for all of the plurality of modes of operation and a timer offset value for at least the second mode, wherein the second inactivity timer duration is based on the common inactivity timer duration and the timer offset value.

13. The UE of claim 10, wherein the mode indication is received while the timer is running and the network entity is operating in the second mode, wherein the timer expiring at the one of the first inactivity timer duration or the second inactivity timer duration comprises the timer expiring at the first inactivity timer duration, and wherein the one or more processors are further configured to execute the computer-executable instructions and cause the UE to reset the timer after receiving the mode indication.

14. The UE of claim 10, wherein the mode indication is received while the timer is running and the network entity is operating in the second mode, wherein the timer expiring at the one of the first inactivity timer duration or the second inactivity timer duration comprises the timer expiring at the second inactivity timer duration.

15. The UE of claim 10, wherein the mode indication is received while the timer is running and the network entity is operating in the second mode, wherein the timer expiring at the one of the first inactivity timer duration or the second inactivity timer duration comprises the timer expiring at the greater of the first inactivity timer duration and the second inactivity timer duration.

16. A network entity configured for wireless communication, comprising: a memory comprising computer-executable instructions; and one or more processors configured to execute the computer-executable instructions and cause the network entity to:
send a default bandwidth part (BWP) configuration information for a plurality of modes of operation, the plurality of modes comprising a first mode associated with a first number of active antennas and a second mode associated with a second number of active antennas, and the default BWP configuration information indicating a first default BWP for the first mode and a second default BWP for the second mode, wherein the default BWP configuration information indicates that the first default BWP is to be used on expiration of an inactivity timer when the network entity is operating in the first mode and that the second default BWP is to be used on expiration of the inactivity timer when the network entity is operating in the second mode; and
send a mode indication indicating operation in the first mode.

17. The network entity of claim 16, wherein the one or more processors are configured to execute the computer-executable instructions and further cause the network entity to:
communicate with a user equipment (UE) using the first default BWP.

18. The network entity of claim 16, wherein the default BWP configuration information comprises a separate default BWP configuration for each of the plurality of modes of operation.

19. The network entity of claim 16, wherein the default BWP configuration information comprises a common default BWP configuration for all of the plurality of modes of operation and a dedicated default BWP configuration for at least the second mode.

20. The network entity of claim 19, wherein the second default BWP is based on the common default BWP configuration and the dedicated default BWP configuration.

21. The network entity of claim 19, wherein the common default BWP configuration includes a first set of parameters and the dedicated default BWP configuration includes a second set of parameters different from the first set of parameters.

22. The network entity of claim 19, wherein the common default BWP configuration includes a first set of parameters and the dedicated default BWP configuration includes a second set of parameters, wherein one or more of the second set of parameters conflict with the first set of parameters, and wherein the second default BWP is based on the one or more of the second set of parameters that conflict with the first set of parameters.

23. The network entity of claim 16, wherein the first default BWP has a first frequency bandwidth, a first starting frequency, a first numerology, and a first search space.

24. The network entity of claim 16, wherein the first mode comprises using a first transmit power, or a first bandwidth for communicating.

25. A network entity configured for wireless communication, comprising: a memory comprising computer-executable instructions; and one or more processors configured to execute the computer-executable instructions and cause the network entity to:
  send bandwidth part (BWP) inactivity timer configuration information for a plurality of modes of operation, the plurality of modes comprising a first mode associated with a first number of active antennas and a second mode associated with a second number of active antennas, and the BWP inactivity timer configuration information configuring a first inactivity timer duration for the first mode and a second inactivity timer duration for the second mode, wherein default BWP configuration information indicates that a first default BWP is to be used on expiration of a timer when the network entity is operating in the first mode and that a second default BWP is to be used on expiration of the timer when the network entity is operating in the second mode; and
  send a mode indication indicating operation in the first mode.

26. The network entity of claim 25, wherein the one or more processors are configured to execute the computer-executable instructions and further cause the network entity to:
  communicate with a user equipment (UE) using a first default BWP based on a timer expiring at one of the first inactivity timer duration or the second inactivity timer duration.

27. The network entity of claim 25, wherein the BWP inactivity timer configuration information separately configures a corresponding inactivity timer duration for each of the plurality of modes of operation.

28. The network entity of claim 25, wherein the BWP inactivity timer configuration information configures a common inactivity timer duration for all of the plurality of modes of operation and a timer offset value for at least the second mode, wherein the second inactivity timer duration is based on the common inactivity timer duration and the timer offset value.

* * * * *